United States Patent
Foser et al.

(10) Patent No.: US 9,377,043 B2
(45) Date of Patent: Jun. 28, 2016

(54) FASTENING METHOD USING A NAIL-SHAPED FASTENING ELEMENT

(75) Inventors: Thomas Foser, Balzers (LI); Ferenc Lor, Buchs (CH); Stefan Boenig, Achberg-Esseratsweiler (DE)

(73) Assignee: Hilti Aktiengesellschaft, Schaan (LI)

( * ) Notice: Subject to any disclaimer, the term of this patent is extended or adjusted under 35 U.S.C. 154(b) by 79 days.

(21) Appl. No.: 13/448,656

(22) Filed: Apr. 17, 2012

(65) Prior Publication Data

US 2012/0198683 A1 Aug. 9, 2012

Related U.S. Application Data

(62) Division of application No. 12/460,624, filed on Jul. 22, 2009, now abandoned.

(30) Foreign Application Priority Data

Aug. 6, 2008 (DE) .................... 10 2008 041 036

(51) Int. Cl.
*F16B 15/02* (2006.01)
*B23P 19/04* (2006.01)
(Continued)

(52) U.S. Cl.
CPC .............. *F16B 15/02* (2013.01); *E04G 17/00* (2013.01); *F16B 43/00* (2013.01);
(Continued)

(58) Field of Classification Search
CPC .......... F16B 15/02; F16B 19/14; F16B 15/00; E04B 1/7633; E04B 13/0835; E04B 3/603; E04D 3/3603; E04D 3/3606; E04D 5/145; E04F 13/0864; E04F 13/0835; B25B 27/06; B25B 27/02; B25B 27/04; B25B 27/0035; B25B 27/14; B25B 27/023; B25B 27/00; B25B 9/00; B23P 19/02; B23P 19/00; B23P 11/025; B23P 19/001; B23P 19/10; B23P 2700/01; B21J 15/14; B21J 15/142; Y10T 29/53796; Y10T 29/53843; Y10T 29/53909; Y10T 29/53943; Y10T 29/49815; Y10T 29/49821; Y10T 29/49822; Y10T 29/49947; Y10T 29/49952
USPC ........ 29/426.1, 525.01, 525.04, 426.5, 426.4, 29/278, 244, 255, 270; 411/480, 482; 81/300–427.5
See application file for complete search history.

(56) References Cited

U.S. PATENT DOCUMENTS 1,497,859 A    6/1924  Lilly ........................... 411/533
1,705,371 A    3/1929  Mehiman
(Continued)

FOREIGN PATENT DOCUMENTS

CN       101396820        *  4/2009
JP        52 019563 U        2/1977
WO    WO 2007/105733 A1    9/2007

OTHER PUBLICATIONS

English Machine translation of CN 101396820.*

*Primary Examiner* — David Bryant
*Assistant Examiner* — Darrell C Ford
(74) *Attorney, Agent, or Firm* — Davidson, Davidson & Kappel, LLC

(57) ABSTRACT

A nail-shaped fastening element having a shank, at whose one end a tip is configured and at whose opposite other end a head is configured, and having a sleeve-shaped washer is disclosed. At a first end facing the tip, the sleeve-shaped washer has a first collar that narrows the opening cross section of the sleeve-shaped washer and, at a second end facing opposite the first end, it has a second circumferentially outwardly disposed collar.

20 Claims, 2 Drawing Sheets

US 9,377,043 B2

Page 2

(51) Int. Cl.
*B23P 19/00* (2006.01)
*B23P 11/00* (2006.01)
*E04G 17/00* (2006.01)
*F16B 43/00* (2006.01)
*B25B 7/00* (2006.01)

(52) U.S. Cl.
CPC ..... *Y10T 29/49815* (2015.01); *Y10T 29/49822* (2015.01); *Y10T 29/49947* (2015.01); *Y10T 29/49952* (2015.01); *Y10T 29/53796* (2015.01); *Y10T 29/53843* (2015.01); *Y10T 29/53909* (2015.01)

(56) References Cited

U.S. PATENT DOCUMENTS

| | | | | |
|---|---|---|---|---|
| 2,171,877 | A | 9/1939 | Johnson | 85/50 |
| 2,203,294 | A | 6/1940 | Engle | 411/487 |
| 3,455,199 | A | 7/1969 | Semanchik | 411/441 |
| 4,007,913 | A * | 2/1977 | Aldrich | 254/18 |
| 4,084,457 | A * | 4/1978 | Berg | 81/424.5 |
| 4,287,656 | A | 9/1981 | Gassman et al. | 29/432 |
| 4,361,997 | A | 12/1982 | DeCaro | 52/512 |
| 4,380,413 | A * | 4/1983 | Dewey | 411/161 |
| 4,464,091 | A * | 8/1984 | Molina | 411/105 |
| 4,732,517 | A * | 3/1988 | Crouch et al. | 411/39 |
| 4,781,503 | A * | 11/1988 | Bogel | 411/368 |
| 4,884,932 | A | 12/1989 | Meyer | 411/373 |
| 4,932,819 | A | 6/1990 | Almeras | 411/441 |
| 5,011,354 | A * | 4/1991 | Brownlee | 411/439 |
| 5,054,983 | A * | 10/1991 | Froewis et al. | 411/480 |
| 5,443,345 | A | 8/1995 | Gupta | 411/441 |
| 5,588,788 | A * | 12/1996 | Dominguez | 411/482 |
| 5,626,451 | A * | 5/1997 | Seibert | 411/533 |
| 5,632,585 | A | 5/1997 | Kluser | 411/441 |
| 5,660,015 | A | 8/1997 | Kluser | 52/410 |
| 5,695,307 | A * | 12/1997 | Takahashi | 411/508 |
| 5,755,545 | A * | 5/1998 | Banks | 411/482 |
| 5,779,421 | A * | 7/1998 | Beck et al. | 411/480 |
| 5,785,478 | A * | 7/1998 | Rotter | 411/487 |
| 5,799,381 | A * | 9/1998 | Gannon et al. | 29/268 |
| 5,870,870 | A | 2/1999 | Utzman | 52/483.1 |
| 6,062,788 | A * | 5/2000 | Ying-Feng | 411/480 |
| 6,062,789 | A * | 5/2000 | Pope | 411/482 |
| 6,183,182 | B1 | 2/2001 | Baumgartner | 411/533 |
| 6,202,517 | B1 * | 3/2001 | Dolan | 81/427 |
| 6,295,773 | B1 * | 10/2001 | Alty | 52/202 |
| 6,464,706 | B1 * | 10/2002 | Winters | 623/13.14 |
| 6,497,543 | B1 * | 12/2002 | Lyons | 411/171 |
| 6,558,098 | B1 | 5/2003 | Angehrn et al. | 411/533 |
| 6,668,501 | B2 * | 12/2003 | Adebar et al. | 52/363 |
| 6,695,288 | B2 * | 2/2004 | Benitez et al. | 254/18 |
| 6,709,214 | B1 | 3/2004 | Angehrn | 411/533 |
| 6,928,778 | B2 * | 8/2005 | Schmid | 52/363 |
| 7,249,752 | B1 * | 7/2007 | Foley | 254/23 |
| 7,326,016 | B2 | 2/2008 | Durig | 411/441 |
| D564,345 | S * | 3/2008 | Prada | D8/391 |
| 7,658,368 | B2 * | 2/2010 | Laun | 254/18 |
| 7,794,190 | B2 * | 9/2010 | Gauthier et al. | 411/441 |
| 8,800,836 | B2 * | 8/2014 | Scott et al. | 227/8 |
| 2003/0024198 | A1 * | 2/2003 | Schmid | 52/578 |
| 2004/0098926 | A1 * | 5/2004 | Haytayan | 52/40 |
| 2007/0107199 | A1 | 5/2007 | Haytayan | 29/525.01 |
| 2008/0019798 | A1 * | 1/2008 | Lee | 411/487 |
| 2008/0175689 | A1 | 7/2008 | Vagedes | 411/487 |
| 2010/0212244 | A1 * | 8/2010 | Yu | 52/363 |
| 2011/0083396 | A1 * | 4/2011 | Shelton et al. | 52/698 |
| 2011/0121142 | A1 * | 5/2011 | Tousignant et al. | 248/73 |
| 2014/0033508 | A1 * | 2/2014 | Haug et al. | 29/525.01 |
| 2014/0366473 | A1 * | 12/2014 | Dissing | 52/474 |

* cited by examiner

FASTENING METHOD USING A NAIL-SHAPED FASTENING ELEMENT

This is a Divisional of U.S. patent application Ser. No. 12/460,624, filed Jul. 22, 2009 and claims priority to German Patent Application DE 10 2008 041 036.5, filed Aug. 6, 2008, both of which are hereby incorporated by reference herein.

BACKGROUND OF THE INVENTION

The present invention relates to a nail-shaped fastening element having a shank, at whose one end a tip is configured and at whose opposite other end a head is configured, and having a sleeve-shaped washer.

Fastening elements of this kind, such as nails made of steel, for example, are used in fastening technology, for example, to fasten components, such as formwork, for example, to hard materials, such as concrete, metal or stone. To this end, the fastening elements have a shank having a tip that is tapered in the setting direction and a head that is disposed at the other end of the shank and whose diameter is greater than that of the shank.

From U.S. Pat. No. 2,171,877, a fastening element in the form of a nail is known, which has a head and a shank that is contiguous thereto and that terminates in a tip. Fitted onto the shank is a washer which is in the form of a conical sleeve and whose largest cross section is disposed at its end facing the tip. A nail of this kind is suited, for example, for being driven into a workpiece by a hammer, the conical sleeve functioning as a spacer element which keeps the head spaced apart from the surface of the workpiece, once the nail is driven in, thereby allowing the nail to be pulled out of the workpiece again.

However, the disadvantage associated with this nail is that it is not suited for being driven in by a combustion-powered setting tool, for example, since the conical sleeve would also be driven into the workpiece or would be subject to spalling on the workpiece due to the high impact energy of such setting tools.

From U.S. Pat. No. 1,705,371, what is generally referred to as a double-headed nail is also known, which has two heads at its end facing opposite the tip. In this context, the lower head, which faces the tip and is formed as a circumferentially extending beading or collar, functions as a drive-in or penetration stop for the nail, while the second nail head, once it is driven into a workpiece, is spaced apart from the surface thereof, thereby allowing the nail to be pulled out of the workpiece again by a tool that is applied to the second head.

However, nails of this kind have the disadvantage of being characterized, on the one hand, by expensive manufacturing and, on the other hand, by poor variability in the use thereof.

SUMMARY OF THE INVENTION

An object of the present invention is to overcome the above mentioned disadvantages and to devise a nail-shaped fastening element that is capable of being set by a setting tool and that nevertheless offers a force-application site for engagement of an extracting tool.

The objective is achieved by a nail-shaped fastening element having a shank, at whose one end a tip is configured and at whose opposite other end a head is configured, and having a sleeve-shaped washer. Accordingly, at a first end facing the tip, the sleeve-shaped washer has a first collar that narrows its opening cross section and, at a second end facing opposite the first end, has a second circumferentially outwardly disposed collar. These measures make it possible for the fastening element according to the present invention to be used for different applications, unlike the known element. Thus, the fastening element according to the present invention may also be set, inter alia, by combustion-powered setting tools, without the sleeve-shaped washer being driven into the workpiece or spalling on the workpiece. The sleeve-shaped washer according to the present invention compensates for variations in the penetration depths that occur when the fastening element according to the present invention is set by setting tools. The result is that the fastened material is always optimally pressed down. Moreover, the manufacturing of the fastening element according to the present invention is not very costly.

The first collar is advantageously designed as a continuously circumferentially extending projection, whereby the sleeve-shaped washer is securely held underneath the head, and the head is prevented from being pulled through when the fastening element according to the present invention is pulled out of a workpiece by a tool.

It is also advantageous when the second collar is designed as a continuously circumferentially and radially outwardly extending projection on the sleeve-shaped washer, respectively on the sleeve portion thereof. This ensures that an extracting tool is able to engage securely on the sleeve-shaped washer.

A height of the sleeve-shaped washer advantageously corresponds to approximately 0.1 to 0.3 times a first height of the fastening element from the tip to the head. This measure allows the fastening element to optimally reproduce a head shape similar to a double-headed form following the setting operation. As a result, a standard tool may be used to engage on the head and to loosen and remove the fastening element.

It is also beneficial when the shank has at least one first portion of a larger diameter and at least one second portion of a smaller diameter, the height of the sleeve-shaped washer corresponding to approximately 0.4 to 0.6 times a second height of the second portion. This measure also allows the fastening element to optimally reproduce a head shape similar to a double-headed form following the setting operation.

BRIEF DESCRIPTION OF THE DRAWINGS

The present invention is illustrated in a plurality of exemplary embodiments in the drawing, whose.

DETAILED DESCRIPTION

Figure 1:
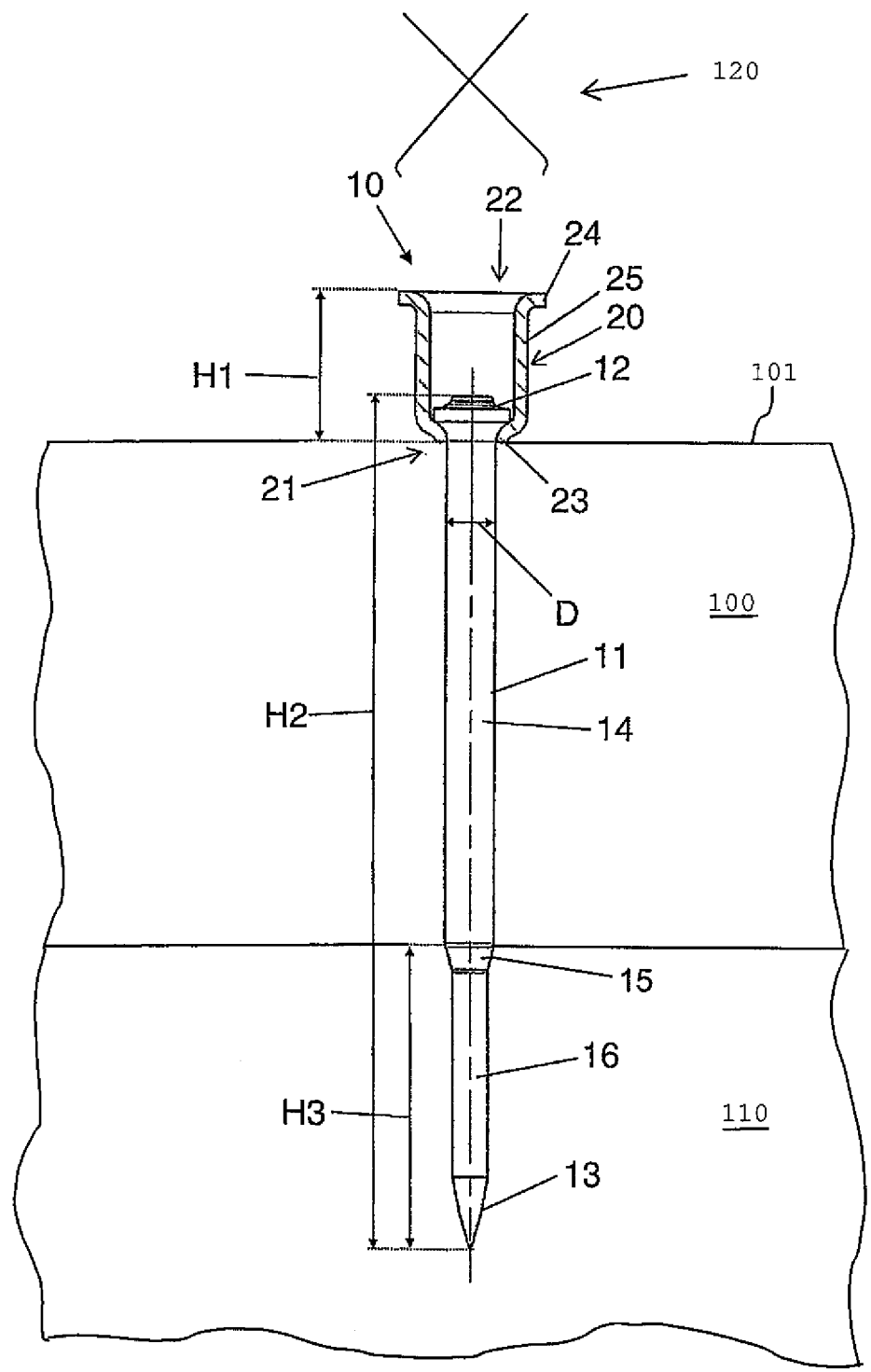
FIG. 1 shows a fastening element according to the present invention in a part-sectional lateral view.

A nail-shaped fastening element 10 designed as a nail is illustrated in FIG. 1. This fastening element 10 has a head 12, a shank 11 that is contiguous thereto, and a tip 13 at the end of shank 11 facing opposite head 12. Shank 11 has three portions 14, 15, 16—a first portion 14 of a larger diameter D, a second portion 16 of a smaller diameter, and a conical transition portion 15 disposed between first portion 14 and second portion 16. Fitted onto shank 11 is a sleeve-shaped washer 20 which, at a first end 21 facing tip 12, has a first collar 23 that narrows the opening cross section of sleeve-shaped washer 20. At a second end 22 facing opposite first end 21, sleeve-shaped washer 20 has a circumferentially outwardly disposed second collar 24. A sleeve portion 25 disposed between the two ends 21, 22 has a cylindrical shape. In this context, the inside diameter of sleeve portion 25 (except for the region of first collar 23) is at least as large as the outside diameter of head 12. In the exemplary embodiment shown, first collar 23 is designed as a continuously circumferentially extending projection that reduces the opening cross section of sleeve portion 25, respectively of sleeve-shaped washer 20. First collar 23 constitutes an abutment for head 12.

Second collar 24 is designed as a continuous circumferential projection that extends radially outwardly on sleeve portion 25 and forms a force-application element for an extracting tool, such as pliers, a hammer or a claw bar.

Both first collar 23, as well as second collar 24 may be formed by a plurality of projections between which free spaces or interruptions are located (not shown in the figures).

A height H1 of sleeve-shaped washer 20 corresponds approximately to 0.1 to 0.3 times a first height H2 of fastening element 10 from tip 13 to head 12. In addition, height H1 of sleeve-shaped washer 20 corresponds to approximately 0.4 to 0.6 times a second height H3 of second portion 16.

When a formwork part 100 is fastened to a structural element 110, such as a concrete element, using stepped nail-shaped fastening element 10 in accordance with the present invention, second portion 16 is driven into the concrete element, while first portion 14 of shank 11 traverses the formwork part. Sleeve-shaped washer element 20 is then situated outside of the formwork part 100 and, as the case may be, engages by its first collar 23 on the surface 101 of the formwork part 100. An extracting tool 120, shown schematically, which may engage on second collar 24 of sleeve-shaped washer element 20, may then be used to pull out nail-shaped fastening element 10 again to dismantle the formwork 100.

Figure 2:
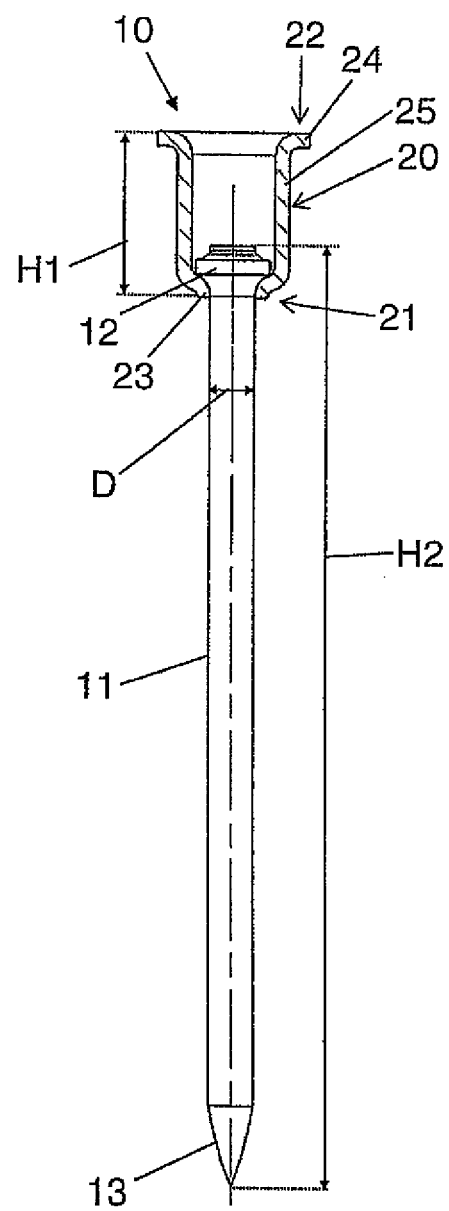
FIG. 2 shows another fastening element according to the present invention in a part-sectional lateral view.

Fastening element 10 illustrated in FIG. 2 differs from fastening element 10 illustrated in FIG. 1 merely in that shank 11 between tip 13 and head 12 has a uniform diameter D that is within the manufacturing tolerances. In the case of this fastening element 10 as well, height H1 of sleeve-shaped washer 20 corresponds approximately to 0.1 to 0.3 times first height H2 of fastening element 10 from tip 13 to head 12. With regard to other reference numerals not mentioned here, reference is made to the preceding description of FIG. 1 in its entirety.

What is claimed is:

1. A method for temporarily fastening a formwork part to a structural element the method comprising:
    attaching the formwork part to the structural element using a nail-shaped fastener applied by a setting tool, the fastener including: a shank having a tip formed at a first end and a head formed at second end opposite the first end; and a sleeve-shaped washer coupled to the head of the shank that includes a first washer end facing the tip of the shank, a second washer end opposite the first washer end, a circumferentially inwardly disposed first collar at the first washer end and a circumferentially outwardly disposed second collar at the second washer end, the circumferentially inwardly disposed first collar narrowing radially inwardly, the attaching causing the first collar to be in contact with an underside of the head and the formwork part, the second collar remaining spaced from the formwork part after the attaching; and
    removing the fastener from the structural element using an extraction tool contacting the second washer end, the first end thereby pulling the head of the fastener to remove the shank from the formwork part.

2. The method as recited in claim 1 wherein the first collar engages on an outer surface of the formwork part after the attaching step.

3. The method as recited in claim 2 wherein the extraction tool engages the second collar during the removing step.

4. The method as recited in claim 1 wherein the extraction tool engages the second collar during the removing step.

5. The method as recited in claim 1 wherein the first collar is designed as a continuously circumferentially extending projection.

6. The method as recited in claim 1 wherein the second collar is designed as a continuously circumferentially and radially outwardly extending projection.

7. The method as recited in claim 1 wherein a height of the sleeve-shaped washer corresponds approximately to 0.1 to 0.3 times a first height of the shank from the tip to the head.

8. The method as recited in claim 1 wherein the shank has at least one first portion of a larger diameter and at least one second portion of a smaller diameter, the height of the sleeve-shaped washer corresponding to approximately 0.4 to 0.6 times a second height of the second portion.

9. A method for removing a nail-shaped fastener temporarily fastening a formwork part to a structural element, the method comprising:
    removing the nail-shaped fastener, the fastener including: a shank having a tip formed at a first end and a head formed at second end opposite the first end; and a sleeve-shaped washer coupled to the head of the shank that includes a first washer end facing the tip of the shank, a second washer end opposite the first washer end, a circumferentially inwardly disposed first collar at the first washer end, the circumferentially inwardly disposed first collar narrowing radially inwardly, and a circumferentially outwardly disposed second collar at the second washer end, the second collar forming a force-application element, from the structural element using an extraction tool pulling on the force-application element.

10. The method as recited in claim 9 wherein the first collar engages on an outer surface of the formwork part prior to the removing step.

11. The method as recited in claim 10 wherein the extraction tool engages the second collar during the removing step.

12. The method as recited in claim 9 wherein the extraction tool engages the second collar during the removing step.

13. The method as recited in claim 9 wherein the first collar is designed as a continuously circumferentially extending projection.

14. The method as recited in claim 9 wherein the second collar is designed as a continuously circumferentially and radially outwardly extending projection.

15. The method as recited in claim 9 wherein a height of the sleeve-shaped washer corresponds approximately to 0.1 to 0.3 times a first height of the shank from the tip to the head.

16. The method as recited in claim 9 wherein the shank has at least one first portion of a larger diameter and at least one second portion of a smaller diameter, the height of the sleeve-shaped washer corresponding to approximately 0.4 to 0.6 times a second height of the second portion.

17. A method for temporarily fastening a formwork part to a structural element the method comprising:
    attaching the formwork part to the structural element using a nail-shaped fastener, the fastener including: a shank having a tip formed at a first end and a head formed at second end opposite the first end; and a sleeve-shaped washer coupled to the head of the shank that includes a first washer end facing the tip of the shank, a second washer end opposite the first washer end, a first collar at the first washer end that narrows an opening cross-section of the washer and a circumferentially outwardly disposed second collar at the second washer end, the attaching causing the first collar to be in contact with an underside of the head and the formwork part, the second collar remaining spaced from the formwork part after the attaching; and removing the fastener from the structural element by pulling on the second collar using an extraction tool, wherein the head of the shank has an outside diameter, the sleeve-shaped washer having a sleeve portion disposed between the first and second washer ends, the sleeve portion having an inside diameter at least as large as the outside diameter.

18. The method as recited in claim 17 wherein the first collar has a first collar inside diameter smaller than the outside diameter.

19. A method for removing a nail-shaped fastener temporarily fastening a formwork part to a structural element, the method comprising:
removing the nail-shaped fastener, the fastener including: a shank having a tip formed at a first end and a head formed at second end opposite the first end; and a sleeve-shaped washer coupled to the head of the shank that includes a first washer end facing the tip of the shank, a second washer end opposite the first washer end, a first collar at the first washer end that narrows an opening cross-section of the washer and a circumferentially outwardly disposed second collar at the second washer end, from the structural element using an extraction tool, wherein the head of the shank has an outside diameter, the sleeve-shaped washer having a sleeve portion disposed between the first and second washer ends, the sleeve portion having an inside diameter at least as large as the outside diameter, the second collar forming a force-application element, the extraction tool pulling on the force-application element.

20. The method as recited in claim 19 wherein the first collar has a first collar inside diameter smaller than the outside diameter.

* * * * *